United States Patent
Hariharasubrahmanian

(10) Patent No.: US 6,819,681 B1
(45) Date of Patent: Nov. 16, 2004

(54) SYSTEMS AND METHODS FOR PREDICTING DATA FIELDS IN LAYERED PROTOCOLS

(76) Inventor: Shrikumar Hariharasubrahmanian, 1381 S. East St., Amherst, MA (US) 01002

( * ) Notice: Subject to any disclaimer, the term of this patent is extended or adjusted under 35 U.S.C. 154(b) by 0 days.

(21) Appl. No.: 09/632,820

(22) Filed: Aug. 7, 2000

Related U.S. Application Data
(60) Provisional application No. 60/147,654, filed on Aug. 6, 1999.

(51) Int. Cl.$^7$ ................................................ H04J 3/00
(52) U.S. Cl. ..................................................... 370/498
(58) Field of Search ......................... 370/498, 392–394, 370/466–469, 455, 446–448, 412, 442, 474, 399, 395; 709/224–236; 375/244, 242, 240.05, 240.24, 260; 455/12.1, 13.1, 500; 708/290; 714/749; 348/419–422

(56) References Cited

U.S. PATENT DOCUMENTS

| | | | | |
|---|---|---|---|---|
| 5,056,058 A | * | 10/1991 | Hirata et al. | 709/230 |
| 5,673,210 A | * | 9/1997 | Etter | 708/290 |
| 5,929,916 A | * | 7/1999 | Legall et al. | 348/419 |
| 6,034,962 A | * | 3/2000 | Ohno et al. | 370/399 |
| 6,226,678 B1 | * | 5/2001 | Mattaway et al. | 709/230 |

\* cited by examiner

Primary Examiner—Kwang Bin Yao
Assistant Examiner—Prenell Jones
(74) Attorney, Agent, or Firm—Cesari and McKenna, LLP

(57) ABSTRACT

A system for predicting one or more fields of a packet that includes multiple fields, the packet belonging to a set of packets broken up into one or more packets by the process of fragmentation or segmentation. Each of the fields stores a value. The system receives one or more of the fields of the packet and determines the value of at least one of the received fields. The system predicts a value of at least one other one of the fields of the packet based on the value of the received field before the other field is received. The system then processes the packet based on the received fields and the predicted field(s).

57 Claims, 11 Drawing Sheets

| SOURCE PORT | DESTINATION PORT |
|---|---|
| SEQUENCE NUMBER ||
| ACKNOWLEDGE NUMBER ||
| HEADER LENGTH / RESERVED / FLAGS | WINDOW |
| CHECKSUM | URGENT POINTER |

| VERSION | HL | TYPE OF SERVICE | TOTAL LENGTH | |
|---|---|---|---|---|
| IDENTIFICATION | | | FLAGS | FRAGMENT OFFSET |
| TIME TO LIVE | | PROTOCOL | HEADER CHECKSUM | |
| SOURCE ADDRESS | | | | |
| DESTINATION ADDRESS | | | | |

332

SYSTEMS AND METHODS FOR PREDICTING DATA FIELDS IN LAYERED PROTOCOLS

RELATED APPLICATION

This application claims priority under 35 U.S.C. section 119 based on U.S. Provisional Application Ser. No. 60/147,654, filed Aug. 6, 1999, the disclosure of which is incorporated herein by reference.

BACKGROUND OF THE INVENTION

A. Field of the Invention

The present invention relates generally to data communication and, more particularly, to systems and methods that predict the reception of parts of data packets before all the data packets are received.

B. Description of Related Art

Conventional communication networks permit communication devices, such as personal computers, servers, laptops, personal digital assistants (PDAs), and other similar devices, to communicate with one another. The communication over these networks are, sometimes, governed by a packetization protocol which specifies the format and representation of the packets, and a packet exchange protocol that governs what the communication devices must or must not do under specific circumstances. These protocols are often defined according to a layered architecture. These protocols are defined under the relavant standards, as applicable to the domains in which the communication devices operate.

Packetization and packet exchange protocols usually require that the communication devices involved in the communication processes store and respond to packets in separate steps that require allocations of memory to hold one or more packets, which are used in the process of generating the appropriate response. Sometimes, protocol specifications allow one packet to be fragmented into smaller packets before delivery to the recipient. In some occasions, such fragmentation occurs in the network, in the course of transmission and delivery of the packet. Further, in some occasions, the data packet produced by a higher protocol layer is fragmented by a lower protocol layer. Packets produced by a protocol layer are sometimes also referred as Segments; the procedure that breaks up data into packets being sometimes referred to as Segmentation. Further, the process of breaking up of a packet into fragments, i.e. fragmentation, produces properly formatted packets; thus packets are sometimes referred to as fragments. Thus, the terms segments, packets and fragments are used interchangeably.

A conventional technique used by a communication device includes receiving one or more packets, whether they may be referred to as packets, or as fragments or as segments, and storing them in a local memory for later processing. Sometimes, a conventional technique used by a communication device includes receiving one or more packets produced in accordance with the fragmentation or segmentation procedures of a lower layer protocol, storing them in a local memory for later processing in accordance with a higher layer protocol. The packets produced in accordance with the lower layer protocol might be referred to as fragments or segments, or in general packets. Likewise, the packets which are in accordance with the formatting specifications of the upper layer protocol may also be referred to as segements, or fragments or in general packets.

A specific processing requirement that conventional techniques sometimes dictate requires processing of a packet formatted in accordance with the specifications of one protocol layer only after an adequate number of bit-fields from the packet have been received. A further specific processing requirement that conventional technique sometimes dictate requires receiving one or more packets formatted according to a standard for segmentation or fragmentation of a full packet, and storing them in local memory for later processing. This technique results in increased delays due to the time consumed in waiting for the additional bit-fields from many packets and in storing and processing one or more packets in more than one distinct step. The technique also places a demand for a large enough memory that can store this set of bit-fields from one or more packets, and memory resources related to the storing and processing of the associated control information.

Some communication devices, such as mini-computers, micro-controllers, and micro-computers, operate in environments where time delays due to waiting for the arrival of additional packets, and due to storage and processing of packets are unacceptable and/or lack sufficient resources to store the bit-fields from one or more packets or perform necessary networking control procedures. To communicate over a packetized communication network, these devices often must associate themselves as slave devices to one or more host computers that contain the resources to perform operations on behalf of the slave devices, transmit information to the other devices on their behalf, and perform operations on the slave devices in response to requests by network devices with which the slave devices are communicating. Such arrangements can result in delays in the processing of the packets, lead to many practical difficulties, and increase the cost of connecting the devices to the communication network.

Further, any communication device connected to a communication network is required to perform processes for responding to a particular set of one or more bit-fields found in one or more packets; each such packet may be received using one or more packets. The reception of one packet as produced by a higher layer protocol in one communicating device in the form of multiple packets at an other communicating device can occur due to various reasons, for example network procedures such as fragmentation and segmentation. Conventional processes dictate that a communication device respond to such a set of bit-fields from such a set of received packets only after complete reception of all such bit-fields from all the related packets. This leads to delays in generation of responses, thereby, causing inefficiencies or, in some cases, unacceptable performance.

As a result, there exists a need for mechanism that permit communication devices that lack sufficient resources to store one or more bit-fields from one or more received packets and/or perform necessary networking control protocols involving these bit-fields to connect directly and inexpensively to a communication network. Also, there exists a need for mechanisms that permit a communication device to respond to a set of one or more packets sent to it more quickly than permitted by conventional systems.

SUMMARY OF THE INVENTION

Systems and methods consistent with the present invention address these and other needs through mechanism that permit communication devices to predict one or more bit-fields in one or more packets before all these packets are received, thereby using their resources efficiently and permitting the devices to respond to these sets of packets before all the packets of the set have been received.

In accordance with the purpose of the invention as embodied and broadly described herein, a system predicts one or more fields of one or more packets that belong to a set of related packets that includes multiple fields. Each of the fields stores a value. The system receives one or more fields of one or more packets and determines the value of at least one of the received fields. The system predicts a value of at least one other one of the fields of one other one of the packets from the set of packets based on the value of the received field before the the other packet containing the other field is received. The system then processes the packet based on the received fiels and the predicted field(s).

In another implementation consistent with the present invention, a method for replying to a set of packets that have multiple fields before the set of packets that are required to be processed for the reply are entirely received, includes receiving one or more fields of one packet; predicting one or more other ones of the fields contained in the other ones of the packets before the other ones of the packets are received; generating a reply packet based on the one or more received fields and the one or more predicted fields; and transmitting the reply packet.

In yet another implementation consistent with the present invention, a computer-readable medium stores instructions executable by one or more processors to perform a method for generating response to packets, having multiple fields, before the set of one or more packets are entirely received. The method includes receiving one or more fields of one packet; predicting one or more other fields of one or more other packets before the one or more other packets are received; and generating a reply packet based on the one or more received fields and the one or more predicted fields.

In a further implementation consistent with the present invention, a method processes packets having multiple fields. The method includes receiving one or more fields of one packet; determining a value of at least one of the received fields; predicting a value of one or more other ones of the fields contained in one more other ones of packets belonging to that set of packets before the one or more other ones of the packets are received; and generating a reply packet based on the one or more received fields and the one or more predicted fields.

BRIEF DESCRIPTION OF THE DRAWINGS

The accompanying drawings, which are incorporated in and constitute part of this specification, illustrate an embodiment of the invention and, together with the description, explain the invention. In the drawings.

FIGS. 4–6 are detailed diagrams of the headers of FIG. 3 in an implementation consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention permit communication devices of limited capabilities, such as those with very restricted memory resources that are unable to store a particular set or significant portion of a particular set of packets, to process and respond to packets in accordance with network protocols. The communication devices may accomplish this feat by predicting one or more fields in one or more packets before the fields are received, thereby efficiently using the memory resources and permitting the communication devices to respond to packets more quickly than was conventionally permitted.

Exemplary Network

Figure 1:
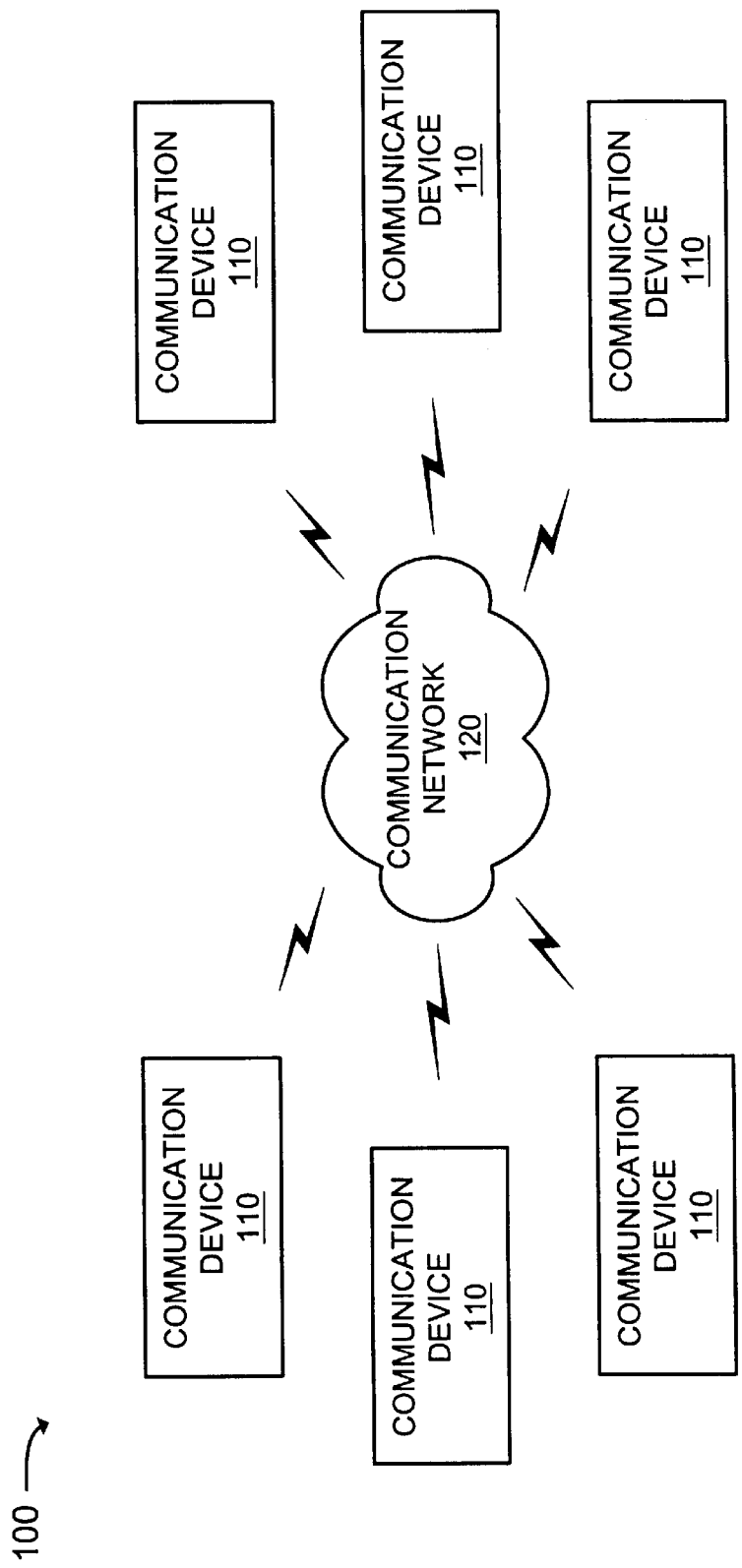
FIG. 1 is a diagram of an exemplary network in which systems and methods consistent with the present invention may be implemented.

FIG. 1 is an exemplary network 100 in which systems and methods consistent with the present invention may be implemented. The network 100 may include communication devices 110 connected to a communication network 120. Six communication devices 110 have been shown in FIG. 1 for simplicity. In practice, the network 100 may include more or less communication devices 110.

The network 120 may include one or more data communication networks, such as the Internet, an intranet, a wide area network (WAN), a local area network (LAN), or the like. In one implementation consistent with the present invention, the network 120 includes a packet-based network that operates according to a communications protocol, such as Transmission Control Protocol and all related protocols, as specified in "Requirements for Internet Hosts— Communication Layers," RFC1122, ftp://ftp.isi.edu/innotes/rfc1122.txt, October 1989.

Each of the communication devices 110 may include a computer device, such as a personal computer, server, laptop, personal digital assistant (PDA), etc., a computer system, such as a system or logic on a chip, an electronic device, or a similar device with or without extensive computational and/or memory resources. The communication devices 110 may connect to the network 120 via wired, wireless or optical communication paths. In one implementation consistent with the present invention, the communication devices 110 connect to the network 120 using a data link protocol, such as the Serial Line Internet Protocol (SLIP), Ethernet, or Token Ring. The communication devices 110 may communicate over the network 120 via a virtual circuit, connection or socket.

Figure 2:
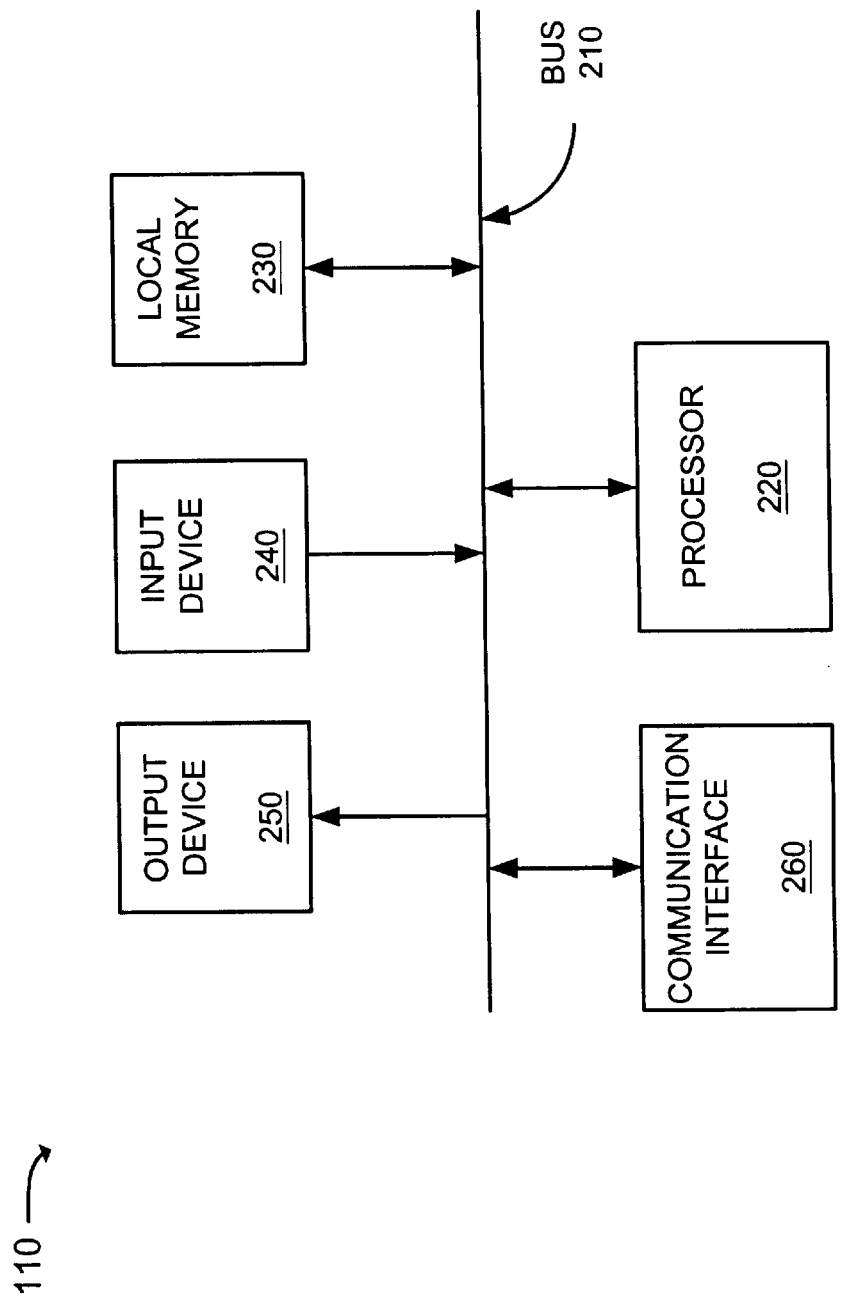
FIG. 2 is a diagram of a communication device of FIG. 1 in an implementation consistent with the present invention.

FIG. 2 is an exemplary diagram of components of a communication device 110 in an implementation consistent with the present invention. The communication device 110 may include a bus 210, a processor 220, a local memory 230, an input device 240, an output device 250, and a communication interface 260. The bus 210 may include one or more busses or conductors that connect together one or more of the components of the communication device 110. The processor 220 may be any type of conventional processor or microprocessor that interprets and executes instructions.

The local memory 230 may be a large or small capacity computer-readable medium that stores information and instructions for use by the processor 220. A computer-readable medium may include one or more memory devices, such as a random access memory (RAM), a read only memory (ROM), or another type of dynamic or static storage device, and/or carrier waves. In one implementation consistent with the present invention, the local memory 230 includes a small capacity memory device capable of storing a small amount of information, less than the information typically included in a packet or in a set of packets.

The input device 240 may include any conventional mechanism that permits a user to input information into the communication device 110, such as a keyboard, a key pad, a mouse, a microphone, a data acquisition device, a sensor, etc. The output device 250 may include any conventional mechanism that outputs information to the user, including a display, a speaker, a transducer, an actuator, etc. The communication interface 260 may include any transceiver-like mechanism that enables the communication device 110 to communicate with the other devices and systems. For example, the communication interface 260 may include mechanisms for communicating via a network, such as a network 120.

As will be described in detail below, a communication device 110, consistent with the present invention, that contains insufficient resources to perform the necessary data packetization and transport protocol procedures may communicate over a network, such as network 120, that requires and/or mandates the use of such protocols and respond to packets before the packets have been completely received. The communication device 110 may perform these tasks in response to processor 220 executing sequences of instructions contained in a computer-readable medium, such as the local memory 230.

The instructions may be read into local memory 230 for another computer-readable medium or from another device via the communication interface 260. Execution of the sequences of instructions contained in local memory 230 causes processor 220 to perform processes that will be described later. Alternatively, hardwired circuitry may be used in place of or in combination with software instructions to implement processes consistent with the present invention. For example, the components of the communication device 110 may be fully implemented in silicon via a combination of logic gates. Thus, the present invention is not limited to any specific combination of hardware circuitry and software.

Exemplary Communication Protocol

Figure 3:
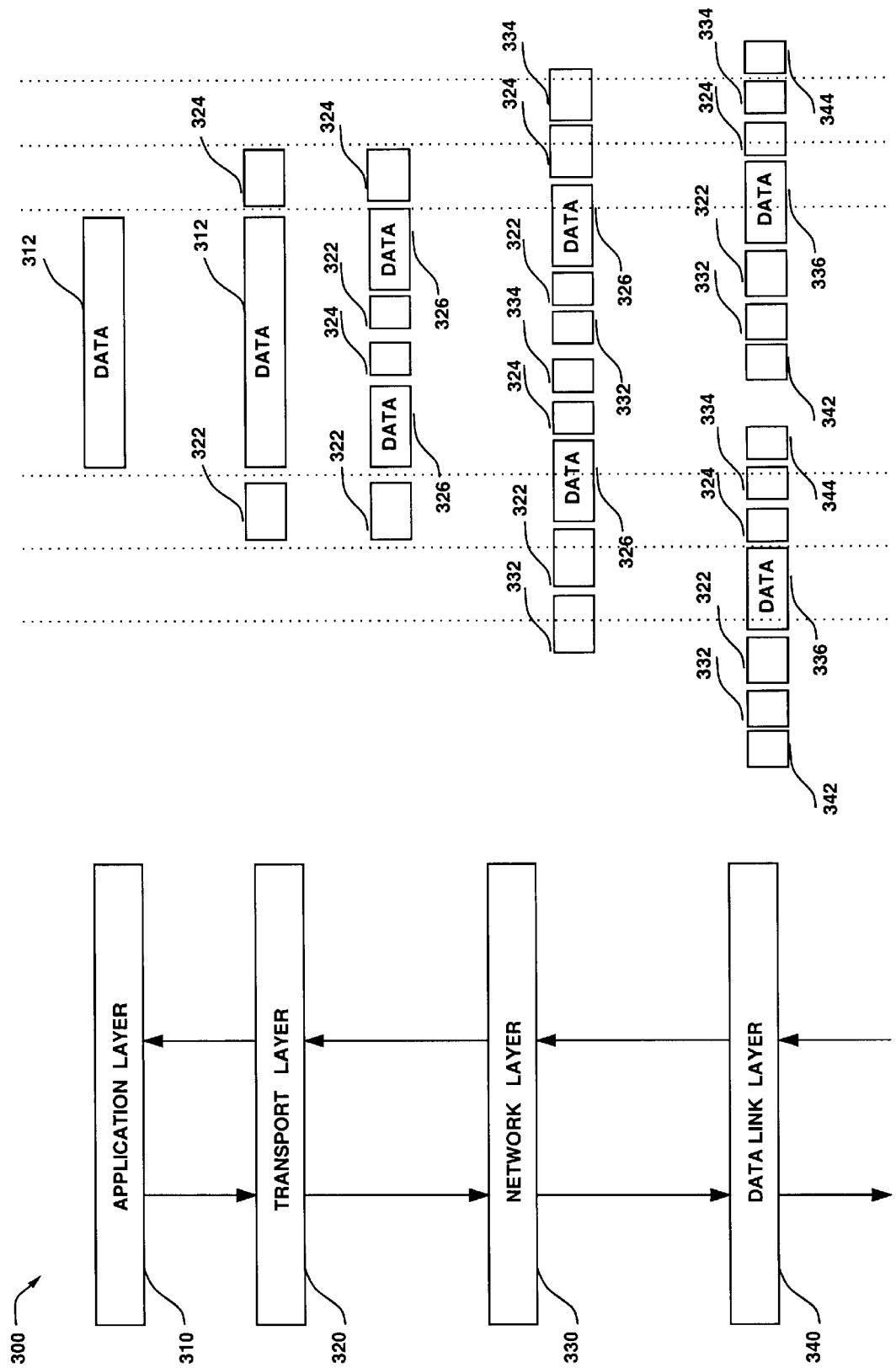
FIG. 3 is an exemplary diagram of a communications protocol used by a communication device of FIG. 1 in an implementation consistent with the present invention.

FIG. 3 is an exemplary diagram of a communications protocol 300 used by a communications device 110 in an implementation consistent with the present invention. The communications protocol 300 includes an application layer 310, a transport layer 320, a network layer 330, and a data link layer 340. The application layer 310 may include the applications or programs that initiate the communication. The application layer 310 may include several application layer protocols for mail, file transfer, remote access, authentication, and name resolution. The application layer 310 may deliver data 312 to the communication network by passing data of a packet to the transport layer 320 along with the socket of the destination packet.

The transport layer 320 may establish a virtual circuit, a connection, or a socket between the source and the destination of the packet. Further, the transport layer 320 may break the packet 312 from the application layer 310 into one or more packets, or segments, 326. The transport layer 320 may attach a header 322 and trailer 324 onto the data field containing the packet 312, or a packet from 326, in accordance with the specifications of the relevant transport protocol. The transport layer 320 passes the packet to the network layer 330 along with the IP address of the destination.

The network layer 330 may accept the packet from the transport layer 320 and prepare the packet for the data link layer 340 by converting the IP address into a physical address, such as a Media Access Control (MAC) address. The network layer 330 may fragmenting the packet 312 or the packet 326 if necessary into the required sizes, to create one or more packets, or fragments, 336. The network layer 330 may generate packets called datagrams by attaching, to the data field, an IP header 332 and trailer 334 onto the packets from the transport layer 320 in accordance with the specifications of the relevant protocol. The network layer 330 passes the datagram to the data link layer 340.

The data link layer 340 may include a data link protocol, such as Ethernet, Token Ring, Asynchronous Transfer Mode (ATM), Fiber Distributed Data Interface (FDDI), Synchronous Optical Network (SONET), or X.25, that is responsible for reliably moving the data across the communications network 120. The data link layer 340 might fragment the packet from 312, or the packet from 326, or the packet from 336 into one or more data link packets 346, if necessary. The data link layer 340 converts the datagram into its own format, which may include adding, to the data field, a header 342 that includes source and destination MAC addresses and a trailer 344 that includes checksum data.

Four layers have been shown in FIG. 3 for simplicity. In practice, the communication device may have more or less number of layers than as shown in FIG. 3.

Figure 6:
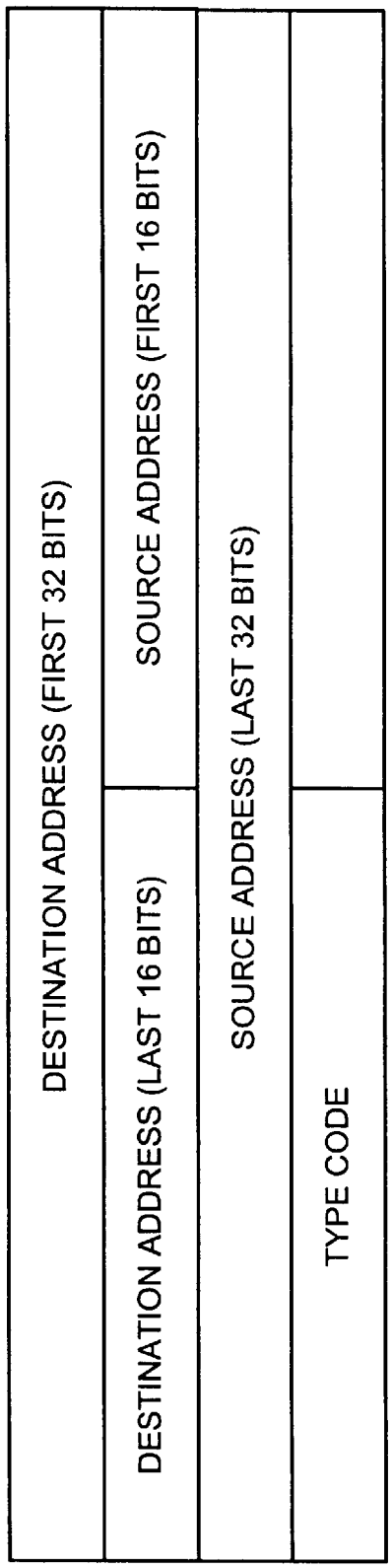

FIGS. 4–6 are detailed diagrams of the headers 322–342, respectively, in an implementation consistent with the present invention. As shown in FIG. 4, the header 322 includes a source port field, a destination port field, a sequence number field, an acknowledge number field, a header length field, a flags field, a window field, a checksum field, and an urgent pointer field. The source port and destination port fields include data that identify the source and destination of a data packet. The sequence number field includes data used to assure the order and delivery of the packet at the destination. The acknowledge field includes data that identifies the next byte of the data that the source expects to receive from the destination.

The header length field includes data that identifies the length of the header 322. The reserved field may be used for future expansions. The flags field may include several flags, such as urgent, acknowledge, push, reset, synchronize, and finish flags. The urgent flag indicates whether the data in the urgent pointer field is valid. The acknowledge flag indicates whether the data in the acknowledgement number field is valid. The push flag indicates whether the accompanying data should be passed on to the application at the destination in an expedited manner. The reset flag indicates whether the connection should be reset. The synchronize flag is used to establish an initial agreement on the sequence numbers. The finish flag indicates whether the source has finished sending data.

The window field includes data that identifies the amount of space the destination has available for storage of unacknowledged data. The checksum field includes a checksum value that may cover both the header 322 and the data 312. The urgent pointer field includes data that identifies whether this packet should take priority over the normal data stream.

Referring to FIG. 5, the header 332 includes a version field, a header length field, a type of service field, a total length field, an identification field, a flags field, a fragment offset field, a time to live field, a protocol field, a header checksum field, a source address, and a destination address. The version field includes data that identifies the version of the protocol being used. The header length field includes data that identifies the length of the header 332. The type of service field includes data that identifies the quality of service to be given to the datagram by the network 320.

The total length field includes data that identifies the length of the datagram (i.e., the headers 322 and 332 and data 312). The identification field includes data used to reassemble a fragmented datagram at the destination. The flags field may include one or more flags that identify, for example, whether the datagram may be fragmented. The fragment offset field includes data that identifies the starting point in relation to the start of the original sent packet.

The time to live field includes a count value that identifies the number of hops/links over which the packet may be routed. The protocol field includes data that identifies the type of transport protocol (e.g., Internet Control Message Protocol (ICMP), Internet Group Managment Protocol (IGMP), Transmission Control protocol or User Datagram Protocol (UDP)) to be used on the datagram at the destination. The header checksum field includes a checksum value that covers the header 332. The source and destination fields include addresses, such as Internet addresses, of the source and destination respectively.

Referring to FIG. 6, the header 342 includes a destination address field, a source address field and a type code field. The source and destination address fields include addresses such as Ethernet addresses, for the source and destination, respectively. The type code field includes data that identifies the data link protocol used to connect the source and destination.

A communication device 110, consistent with the present invention, may predict the value of some fields in a packet, which may include header fields or data fields, based on the value of one or more other fields, which may be header fields or data fields. In other words, the communication device 110 may determine the value of some header or data fields before the header or data fields received based on the values of one or more header or data fields that have been received. This may be accomplished because the packets received by the communication device 110 have useful correlation, or correlations, between some fields that have already been received and some other fields in the packet that have yet to arrive. These correlations may either be incidental in the regular operation of the communications protocol and can be observed by analysis of the protocol specifications or may be arranged to occur by specific design.

In the latter case, some elements of the application layer 310 using the transport connection may be arranged to have certain properties constraining their design and selection in a manner that makes the advance determination of packet fields with adequate certainty feasible. For example, suppose the length of a request query from the application layer 310 is constrained by design to be more than a minimum length, such as at least 19 characters long, so that any packet containing such a request can be identified as such with sufficient certainty, based on examination of a packet length field received early in the reception of the packet.

Further, the transport layer procedure of acknowledging the data received may be modified in such a manner that the transport layer 320 only acknowledges a fraction of the data received. In this case, the data may be retransmitted after an applicable timeout period. As a result, subsequent packets on the same virtual circuit, connection, or socket, including, for example, retransmissions of data that is outstanding as not acknowledged, may have a certain minimum value of their length. For example, packets other than the first few packets and last few packets on the same virtual cirtuit, connection, or socket may have a packet length that is adequately distinguished from the packet length of the first few and last few packets. Therefore, the first and last few packets may be identified based on the packet length field.

Exemplary Processing

Figure 7A:
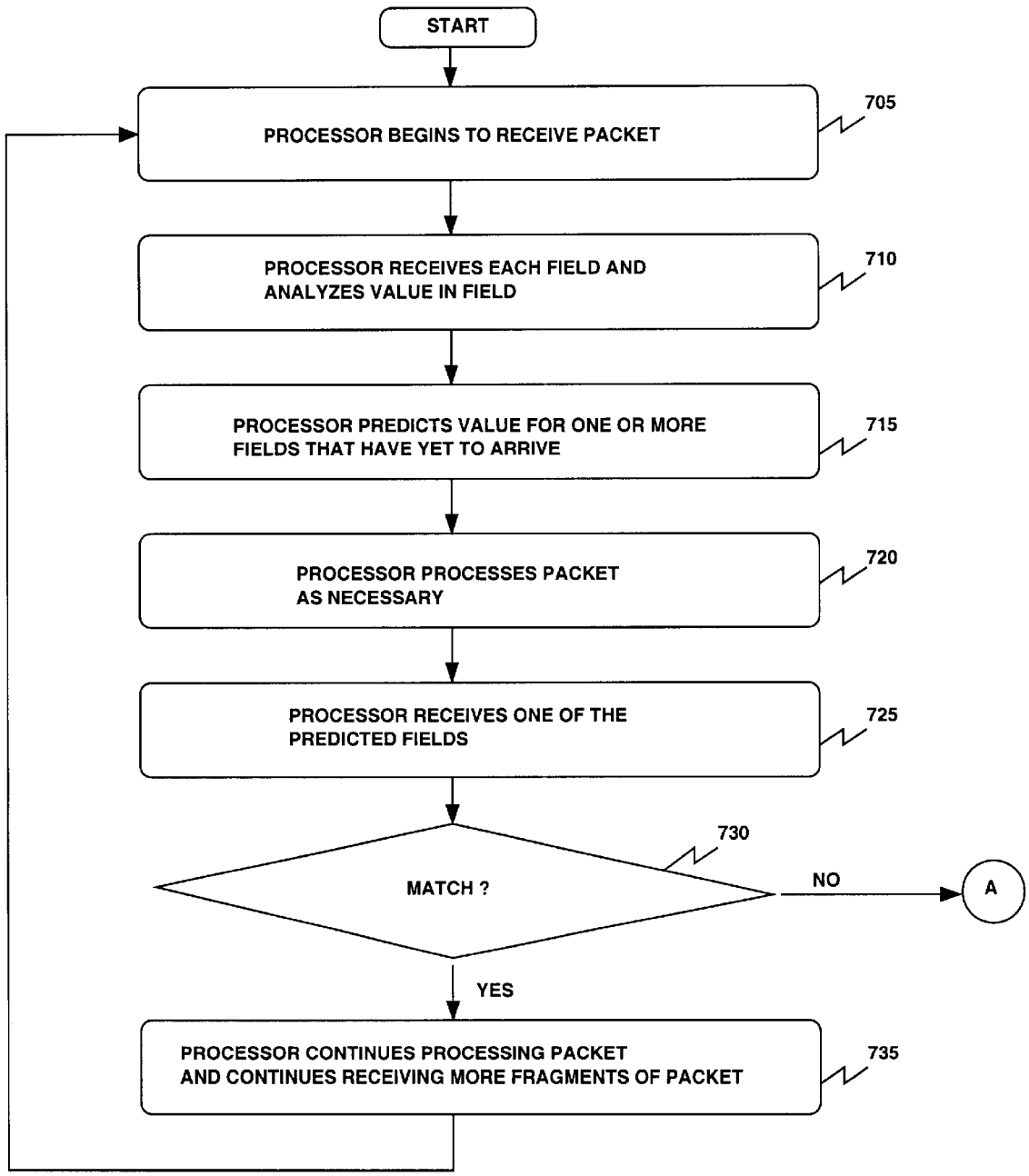
FIGS. 7A and 7B are flowcharts of processing for predicting fields of a received packet in accordance with an implementation consistent with the present invention.
Figure 7B:
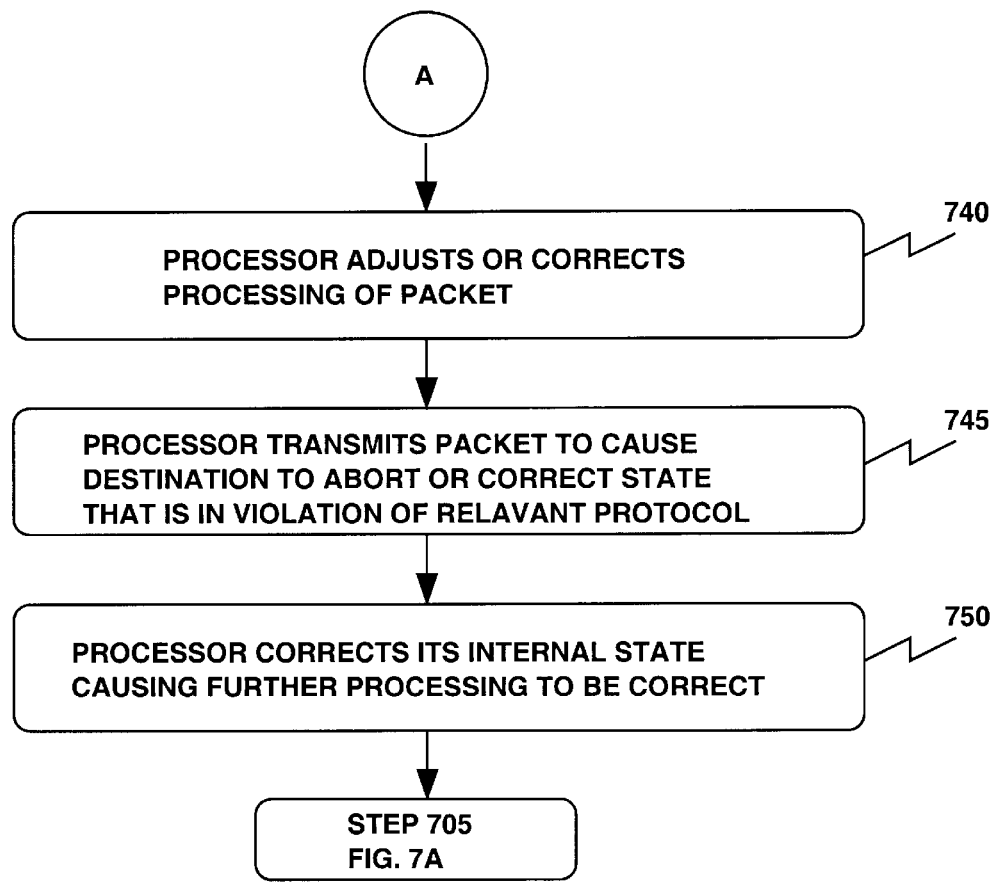
Figure 8:
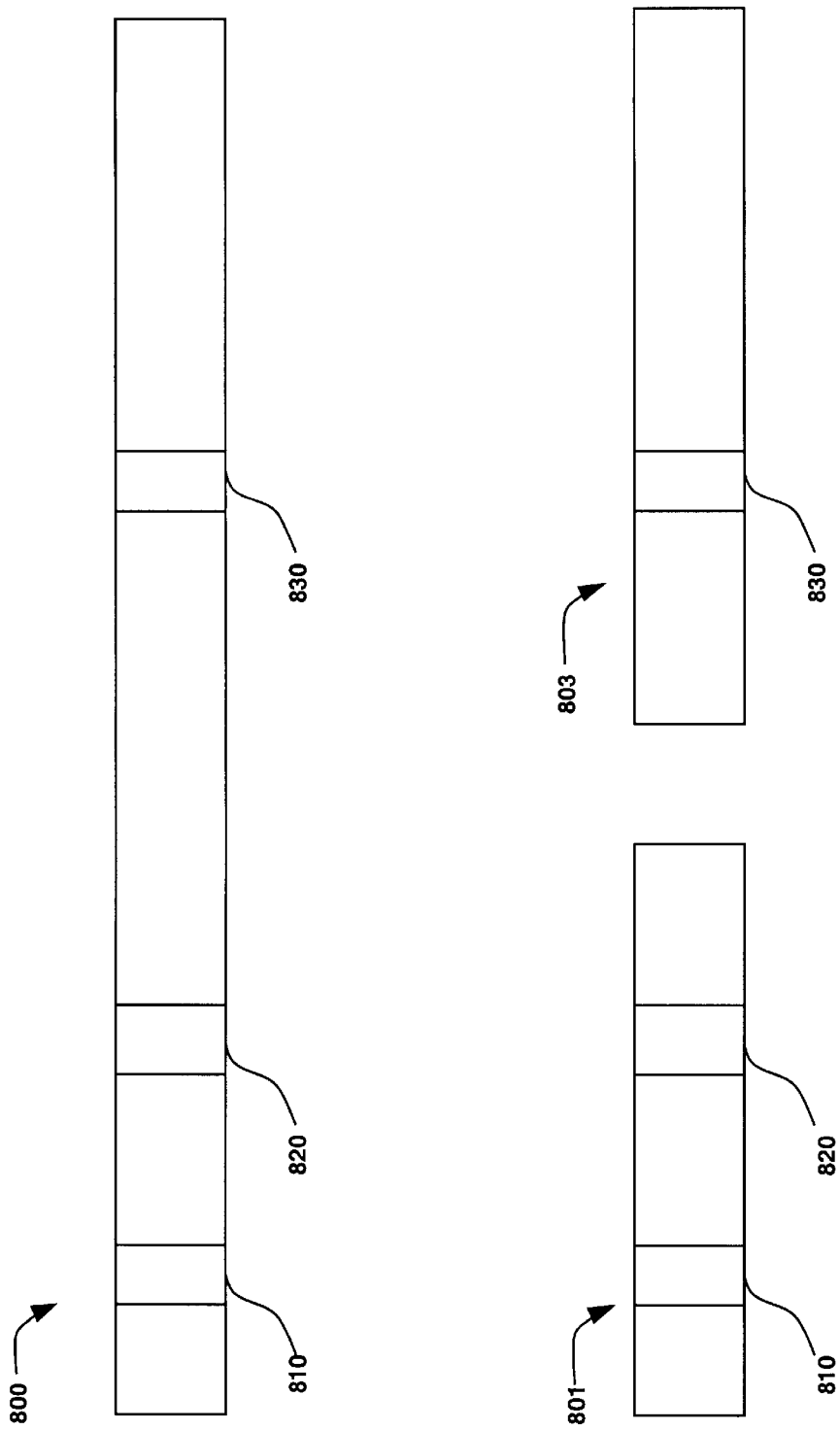
FIG. 8 is an exemplary diagram of a packet in an implementation consistent with the present invention.

FIGS. 7A and 7B are flowcharts of processing for predicting fields of a received packet in accordance with an implementation consistent with the present invention. To facilitate the discussion that follows, assume that the communication device 110 receives the packet illustrated in FIG. 8. FIG. 8 is an exemplary diagram of a packet 800 in an implementation consistent with the present invention. The packet 800 includes multiple fields, including fields 810, 820, and 830. The packet 800 may be received as one or more fragments, or segments, or packets, due to the fragmentation, segmentation or packetization procedures peformed by lower layers. For example, packet 800 is shown as broken into two such packets 801 and 802. In practice, the packet 800 may be broken into more or less number of packets. The fields 810, and 820 are shown in packet 801, and field 830 is shown in packet 803. In practice, these fields 810, 820, and 830, may be distributed between the one or more packets in any suitable combination.

Assume that the communication device 110 predicts fields 820 and 830 based on field 810. Processing may begin when the communication device 110 starts to receive the packet 800, or the packet 801 from, for example, another communication device 110 on the network 120 [step 705]. During this time the communication device 110 may receive the initial packet framing bytes and the fields prior to the field 820. The processor 220 (FIG. 2), for example, within the communication device 110 received each field of the packet 800 and analyzes the value in the fields [step 710].

When the processor 220 receives field 810, it analyzes the value in the field 810 and predicts the values for one or more fields that have yet to arrive, such as fields 820 and 830 [step 715]. The field 820 and/or 830 may arrive later, as a part of the current packet 800. Alternatively, the fields 820 and/or 830 may arrive later, separately in a part of a later packet 802, should it be the case that some fragmentation or segmentation has occured splitting the original packet 800 into fragments or segments 801 and 802. In practice, the packet 800 may be split into more or less number or packets, and the fields 820 and/or 830 may be expected to be received over more or less number or packets received by the communication device.

In one implementation consistent with the present invention, field 810 is the fragment offset field within the header 332 (FIG. 5), field 820 is the flags field, including acknowledge, synchronize, and finish flags within the header 322 (FIG. 4), and field 830 is a portion of data field carried within one of the fragments 336 which has been derived from the packet 326 from the transport layer. The processor 220 may make its predictions based on the following rules:

Predicting Data Field 830 due to Fragmentation:
  If the value of the fragment offset field 810 is zero, then predict that the packet contains a suitable value of the portion of the data field 830 to match any value and length of the data field 830 as expected by the application protocol.

If the value of the fragment offset field 810 is non-zero, indicating that this packet is the latter fragment 802, then verify that the value of the data contained in the data field 830 does match, with adequate acceptability, the data field value as was predicted in the above case.

In another implementation consistent with the present invention, field 810 is the sequence number field in header 322 (FIG. 4), field 820 is the flags field, including acknowledge, synchronize, and finish flags within the header 322 (FIG. 4), and field 830 is a data field carried within one of the segments 326 which has been derived from the packet 312 from the application layer by the process of segmentation done by the transport layer. For example, the application protocol data fields in the packet 312 might belong to HyperText Transfer Protocol (HTTP).

Predicting Data Field 830 due to Segmentation:

If the value of the sequence number field 810 indicates that this packet is the first packet in the received stream of data from the application data packet 312, then predict that the packet contains a suitable value of the portion of the data field 830 to match any value and length of the data field 830 as expected by the application protocol.

If the value of the sequence number field 810 indicates that this packet is a packet subsequent to the first packet in the received stream of data from the application data packet 312, then verify that the value of the data contained in the data field 830 does match, with adequate acceptability, the data field value as was predicted in the above case.

In other implementations consistent with the present invention, other fields and rules may be used. The processor 220 may record its predictions in any suitable, efficient manner.

The processor 220 then processes the packets as necessary in accordance with the predictions [step 720]. For example, the processor 220 may begin preparing a reply packet based on the received and predicted fields and begin transmitting the reply packet to the destination (e.g., a communication device 110). In addition, the processor 220 may confirm earlier predictions based on values of one or more fields.

Figure 9:
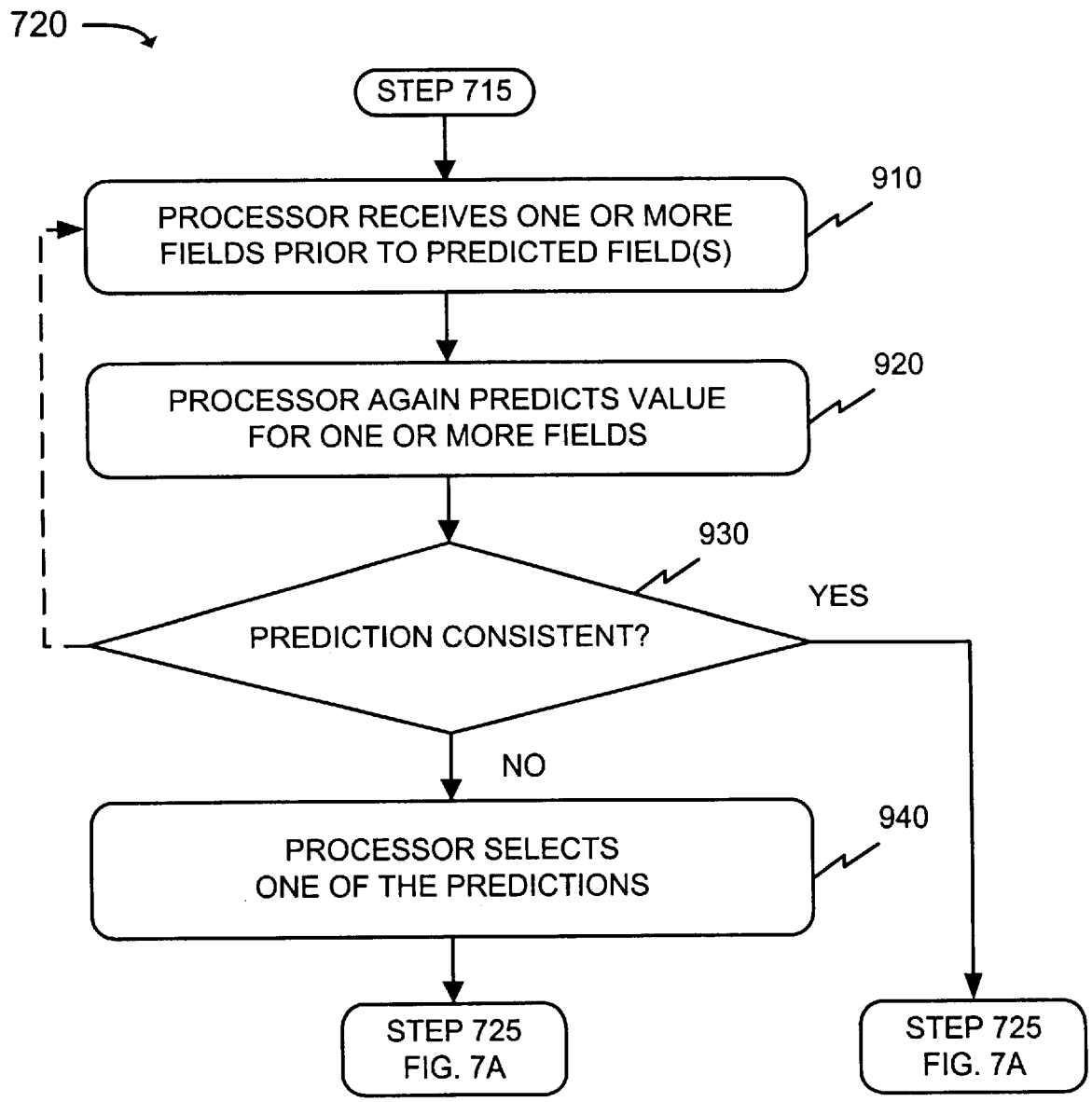
FIG. 9 is a flowchart of processing for reconfirming predictions according to an implementation consistent with the present invention.

FIG. 9 is a flowchart of processing for reconfirming predictions according to an implementation consistent with the present invention. The processor 220 receives one or more fields prior to the predicted field(s) (i.e., one or more additional fields that are received before the processor 220 receives the predicted field(s)) [step 910]. The processor 220 may again predict the value for one or more of the predicted fields based on the values in the received fields [step 920]. The processor 220 may make this prediction in a manner similar to the earlier predictions.

The processor 220 may then determine whether the later predictions are consistent with the earlier predictions [step 930]. The processor 220 may make this determination multiple times (e.g., for multiple earlier-received fields). If the predictions are inconsistent, the processor 220 may select one of the predictions using, for example, predetermined selection rules [step 940]. Alternatively, the processor 220 may continue processing at step 740 (FIG. 7B). If the processor 220 selects one of the predictions or the predictions are consistent the processor 220 may continue processing at step 725 in FIG. 7A.

Returning to FIG. 7A, the processor 220 eventually receives the actual data in the fields 820 and 830 [step 725]. When the processor 220 receives the data in the fields 820 and 830, the processor 220 analyzes the fields to determine whether the actual values match the predicted values [step 730]. The processor 220 may make the determination through a simple comparison of the actual and predicted values. Alternatively, the processor 220 may base its determination on a degree of match. In other words, only predicted values that differ significantly from the actual values may be considered as not matching.

If the values match, the processor 220 may continue processing of the packet [step 735]. The continues processing may entail completing and transmitting a reply packet to the destination. In addition, the processor 220 may recheck the earlier predictions.

Figure 10:
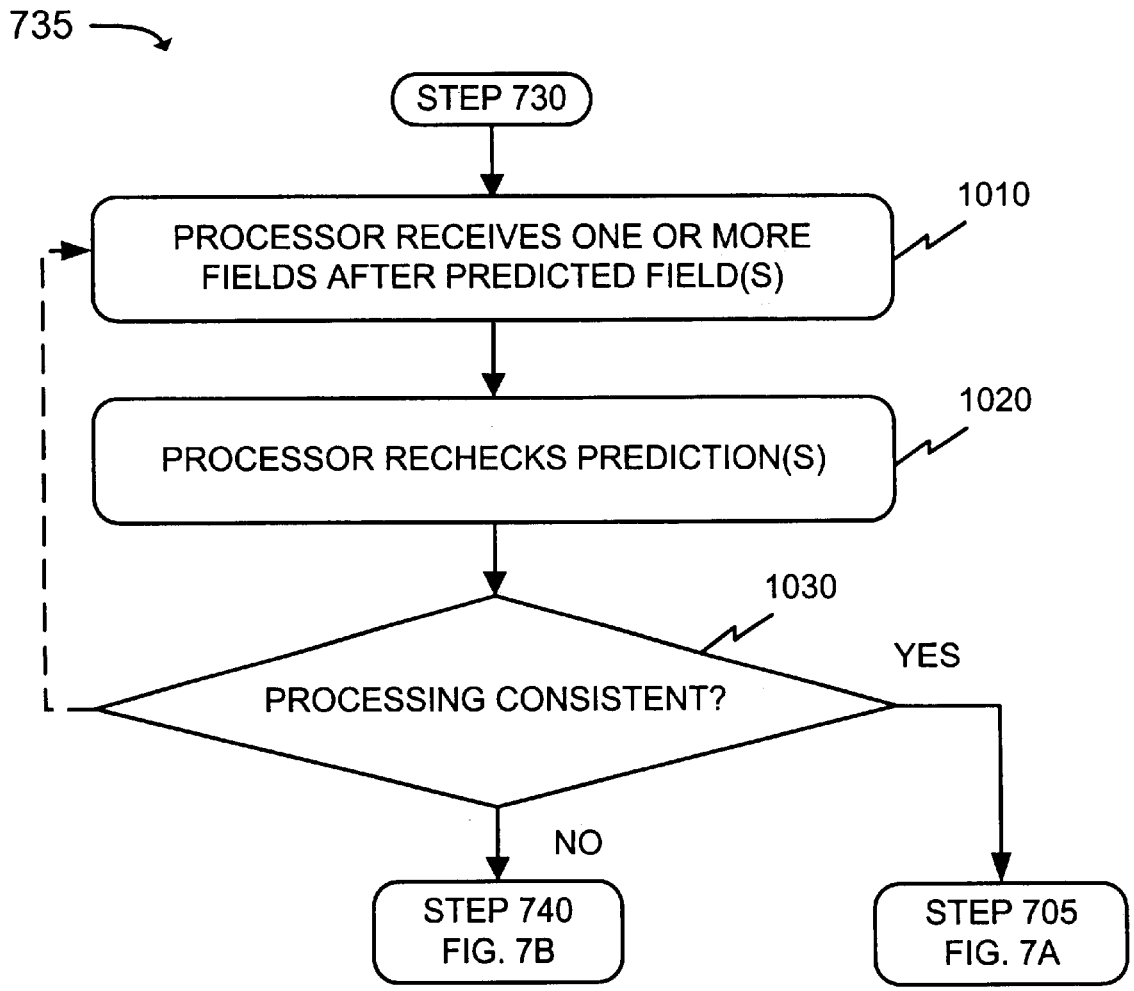
FIG. 10 is a flowchart of processing for rechecking earlier predictions according to an implementation consistent with the present invention.

FIG. 10 is a flowchart of processing for rechecking earlier predictions according to an implementation consistent with the present invention. The processor 220 receives one or more fields of the packet after the predicted field(s) (i.e., one or more fields that are received by the processor 220 after the predicted field(s)) [step 1010]. These one or more fields may be received by the communication device 110 as contained in separate packets which are formed from the one packet as a result of fragmentation or segmentation procedures. The processor 220 may recheck the earlier predictions based on the values for these later-received fields [step 1020]. For example, the processor 220 may determine whether the processing of the packet is occuring in a manner consistent with the predicted and/or actual values of the predicted fields [step 1030]. The processor 220 may make this determination multiple times (e.g., for multiple later-received fields).

If one or more processing errors are detected, the processor 220 may continue processing at step 740 in FIG. 7B. If no processing errors are detected, the processor 220 may then await arrival of the next packet and repeat processing beginning at step 705 in FIG. 7A.

Returning to FIG. 7A, if the predicted value for one or more fields 820 and 830 fails to match the actual value for the field(s) [step 730], the processor 220 may adjust or abort its processing of the packet [step 740] (FIG. 7B). The processor 220 may also prevent transmission of further packets that are in violation of the transport or other relavant protocol [step 745]. To prevent packets which display violations of the protocol from having undesirable effects when received by the destination, the processor 220 may cause packets or packet fragments that have already been transmitted to be discarded [step 750]. The processor 220 may do this by transmitting an abort packet, or other suitable packet. This causes the network 120, or the destination, to abort the current connection, or to perform suitable corrective actions which will circumvent the undesirable consequences. The processor may then return to step 705 to await the reception of the next packet.

CONCLUSION

Systems and methods consistent with the present invention provide mechanisms by which a communication device of limited resources can participate in communications over a network. The mechanisms permit the communication device to predict the value of certain fields in a packet before the fields are received. In this way, the communication device may efficiently use its memory resources and may respond to received packets in an expedited manner (i.e., before the packets have been completely received).

The foregoing description of preferred embodiments of the present invention provides illustration and description, but is not intended to be exhaustive or to limit the invention to the precise form disclosed. Modifications and variations are possible in light of the above teachings or may be acquired from the practice of the invention. For example, while a series of steps have been described with regard to FIGS. 7A and 7B, the order of the steps may be changed in other implementations consistent with the present invention. In addition, in other implementations consistent with the present invention, the communication device 110 may use the value of other received fields of a packet to verify its predictions before the predicted fields are received. Further, the communication device 110 may use any other application protocol, as required by the application.

Further, it has been described that the communication device 110 predicts one or more fields based on the value in one of the received fields. In other implementations consistent with the present invention, the communication device 110 makes it predictions based on values in two or more received fields or a combination of received fields. The communication device 110 may also reconfirm predictions using one or more fields received earlier or later than the predicted fields.

The scope of the invention is defined by the claims and their equivalents.

What is claimed is:

1. A method for predicting one or more fields of a packet having a plurality of fields, the packet belonging to a set of packets, each of the fields containing data representing a value, the method comprising:
   receiving one or more of the fields of the packet;
   analyzing a first value of at least one of the received fields;
   predicting a second value of at least one other field of the packet not yet received, based on a correlation between the first value and a property of the at least one other field not yet received; and
   processing the packet based on the one or more received fields and the predicted at least one other field.

2. A method for predicting one or more fields of a packet having a plurality of fields, the packet being broken into one or more packets, each of the fields storing data representing a value, the method comprising:
   receiving one or more of the fields of the packet;
   analyzing the value of at least one of the received fields;
   predicting a value of at least one other field of the packet not yet received, based on the value of the at least one received field;
   processing the packet based on the one or more received fields and the predicted at least one other field; and
   generating a reply packet based on the one or more received fields and the predicted at least one other field.

3. The method of claim 1, further comprising:
   receiving the at least one other field.

4. The method of claim 3, further comprising:
   receiving one or more additional fields of the packet after receiving the at least one other field; and
   rechecking the second value using a value in the one or more additional fields.

5. The method of claim 3, wherein the processing includes:
   determining whether a received value of the received at least one other field matches the second value of the predicted at least one other field.

6. The method of claim 5, further comprising:
   performing corrective measures on the processing of the set of packets when the received value fails to match the second value.

7. The method of claim 5, further comprising:
   preventing transmission of reply information corresponding to the packet when the received value fails to match the second value.

8. The method of claim 5, further comprising:
   causing a communication context already established to be aborted when the received value fails to match the second value.

9. The method of claim 5, further comprising:
   continuing processing of the packet based on the one or more received fields and the received at least one other field when the received value matches the second value.

10. The method of claim 3, wherein the processing includes:
    determining whether a received value of the received at least on other field substantially matches the second value.

11. The method of claim 1, wherein at least one received field includes a fragment offset field and the predicted at least one other field includes a protocol data field.

12. The method of claim 1, wherein the at least one received field includes a sequence number field and the predicted at least one other field includes a protocol data field.

13. The method of claim 1, wherein the at least one received field includes a fragment offset field, and the predicted at least one other field includes a flags field and a protocol data field.

14. The method of claim 1, further comprising:
    analyzing a third value of at least one additional one of the received fields; and
    confirming the second value using the third value of the at least one additional field.

15. The method of claim 14, wherein the confirming includes:
    predicting a fourth value of the at least one other field using the third value of the at least one additional field, and
    comparing the fourth value and the second value.

16. A system for predicting one or more fields of a packet having a plurality of fields, the packet belonging to a set of packets, each of the fields containing data representing a value, the system comprising:
    means for obtaining one of the fields of the packet;
    means for determining a first value of the obtained field;
    means for predicting a second value of one or more other fields of the packet based on a correlation between the first value and a property of one or more other fields before the one or more other fields are obtained; and
    means for processing the packet based on the obtained field and the predicted one or more other fields.

17. A system for predicting one or more fields of a packet having a plurality of fields storing data, such a packet belonging to a set of packets, the system comprising:
    a memory configured to store instructions; and
    a processor configured to execute the instructions to receive one or more fields of the packet, to determine a first value of at least one of the received fields, to predict a second value of one or more other fields not yet received based on a correlation between the first value, and a property of one or more other fields not yet received and to process the packet based on the one or more received fields and the predicted one or more other fields.

18. A system for predicting one or more fields of a packet having a plurality of fields containing data, such a packet belonging to a set of packets, the system comprising:

a memory configured to store instructions; and a processor configured to execute the instructions to receive one or more fields of the packet, to determine a first value of at least one of the received fields, to predict a second value of one or more other fields not yet received based on a correlation between the first value and a property of one or more other fields not yet received and to process the packet based on the one or more received fields and the predicted one or more other fields wherein the processor, when processing the packet, is configured to generate a reply packet based on the at least one received field and the predicted one or more other fields.

19. The system of claim 17, wherein the processor is further configured to receive the one or more other fields.

20. The system of claim 19, wherein the processor is further configured to receive one or more additional fields of the packet after receiving the one or more other fields and recheck the second value using the one or more additional fields.

21. The system of claim 19, wherein the processor, when processing, is configured to determine whether a third value of the received one or more other fields matches the second value.

22. The system of claim 21, wherein the processor is further configured to take corrective actions according to a protocol when the third value of the received one or more other fields fails to match the second value.

23. The system of claim 21, wherein the processor is further configured to prevent transmission of continued reply information in response to the packet when the third value fails to match the second value.

24. The system of claim 21, wherein the processor is further configured to cause reply information already transmitted in response to the packet to be discarded when the third value fails to match the second value.

25. The system of claim 21, wherein the processor is further configured to continue processing of the packet based on the one or more received fields and the received one or more other fields when the third value of the received one or more other fields matches the second value.

26. The system of claim 19, wherein the processor, when processing, is configured to determine whether a third value of the received one or more other fields substantially matches the second value.

27. The system of claim 17, wherein at least one received field includes a fragment offset and the predicted one or more other fields includes a flags field and a protocol data field.

28. The system of claim 17, wherein the processor is configured to analyze a fourth value of at least one additional one or the received fields and confirm the second value using the fourth value.

29. The system of claim 28, wherein the processor, when confirming, is configured to predict another value of the one or more additional fields using the fourth value of at least one additional field and compare the fourth value and the second value.

30. A computer-readable medium that stores instructions executable by one or more processors to perform a method for predicting at least one field of a packet, the packet belonging to a set of packets including a plurality of fields, the computer-readable medium comprising:

instructions for obtaining one or more of the fields of the packet;

instructions for predicting at least one other field based on a correlation between at least one of the one or more obtained fields and a property of at least one other field before the at least one other field is received; and instructions for processing the packet based on the one or more obtained fields and the predicted at least one other field.

31. A computer-readable medium that stores instructions executable by one or more processors to perform a method for predicting at least one field of a packet, the packet being broken up into one or more packets, the packets including a plurality of fields, the computer-readable medium comprising:

instructions for obtaining one or more of the fields of the packet;

instructions for predicting at least one other field based on at least one of the one or more obtained fields before the at least one other field is received; and instructions for processing the packet based on the one or more obtained fields and the predicted at least one other field; and instructions for generating a reply packet based on the one or more obtained fields and the predicted at least one other field.

32. The computer-readable medium of claim 31, further comprising:

instructions for obtaining the at least one other field.

33. The computer-readable medium of claim 32, further comprising:

instructions for obtaining one or more additional fields of the packet after obtaining the at least one other field; and instructions for rechecking the predicted at least one other field using the one or more additional fields.

34. The computer-readable medium of claim 32, wherein the instructions for processing include:

instructions for determining whether the obtained at least one other field matches the predicted at least one other field.

35. The computer-readable medium of claim 34, further comprising:

instructions for correcting a protocol state for processing the packet when the obtained at least one field fails to match the predicted at least one other field.

36. The computer-readable medium of claim 34, further comprising:

instructions for preventing transmission of reply information in response to the packet when the obtained at least one field fails to match the predicted at least one other field.

37. The computer-readable medium of claim 34, further comprising:

instructions for causing reply information already transmitted in response to the packet to be discarded when the obtained at least one field fails to match the predicted at least one other field.

38. The computer-readable medium of claim 34, further comprising:

instructions for continuing processing of the packet based on the one or more obtained fields and the predicted at least one other field when the obtained at least one other field matches the predicted at least one other field.

39. The computer-readable medium of claim 30, wherein the at least one obtained field includes a fragment offset field and the predicted at least one other field includes a protocol data field.

40. The computer-readable medium of claim 30, wherein the at least one obtained field includes a sequence number field and the predicted at least one other field includes a protocol data field.

41. The computer-readable medium of claim 30, wherein the at least one obtained field includes a total length field and the predicted at least one other field includes a protocol data field and a flags field.

42. The computer-readable medium of claim 30, further comprising:

instructions for analyzing at least one additional one of the obtained fields; and instructions for confirming the predicted at least one other field using the at least one additional field.

43. The computer-readable medium of claim 42, wherein the instructions for confirming include:

instructions for predicting again the at least one other field using the at least one additional field, and instructions for comparing the at least one other field predicted using the at least one additional field to the at least one other field predicted based on the at least one obtained field.

44. A method for replying to packets that have a plurality of fields, the packets being broken up into one or more packets, before the packets are entirely received, comprising:

receiving one or more of the fields of the packet;

predicting one or more other fields of the packet before the one or more other fields are received;

generating a reply packet based on the one or more received fields and the predicted one or more other fields; and transmitting the reply packet.

45. The method of claim 44, wherein the predicting includes:

predicting the one or more other fields using at least one of the one or more received fields.

46. The method of claim 44, further comprising:

receiving the one or more other fields; and determining whether the received one or more other fields match the predicted one or more other fields.

47. The method of claim 46, further comprising:

correcting the continued transmission of subsequent reply packets when the received one or more other fields fail to match the predicted one or more other fields.

48. The method of claim 46, further comprising:

transmitting a packet for causing the state of the communication context at the destination to be corrected when the received one or more other fields fail to match the predicted one or more other fields.

49. A system for replying to packets that have a plurality of fields, the packets being broken up into one or more packets, before the packets are completely received, comprising:

a memory configured to store instructions for obtaining one or more fields of the packet, predicting one or more other fields of the packet before the one or more other fields are obtained, generating a reply packet based on the one or more obtained fields and the predicted one or more other fields, and transmitting the reply packet; and a processor configured to execute the instructions in the memory.

50. The system of claim 49, wherein the instructions for predicting include:

instructions for predicting the one or more other fields using at least one of the one or more obtained fields.

51. The system of claim 49, wherein the memory is further configured to store instructions for obtaining the one or more other fields and determining whether the obtained one or more other fields substantially match the predicted one or more other fields.

52. The system of claim 51, wherein the memory is further configured to store instructions for preventing further transmission of the reply packets when the obtained one or more other fields fail to substantially match the predicted one or more other fields.

53. The system of claim 51, wherein the memory is further configured to store instructions for causing the transmission of a packet to cause the connection state at the destination to be corrected when the obtained one or more other fields fail to substantially match the predicted one or more other fields.

54. A computer-readable medium that stores instructions executable by one or more processors to perform a method for generating responses to packets having a plurality of fields, the packets being broken into one or more packets, before the packets are entirely received, the method comprising:

receiving one or more fields of the packet;

predicting one or more other fields of the packet before the one or more other fields are received; and generating a reply packet based on the one or more received fields and the predicted one or more other fields.

55. A method for processing packets having a plurality of fields, the packets being broken into one or more packets, comprising:

receiving one or more of the fields of the packet;

determining a value associated with at least one of the received fields;

predicting a value of one or more other fields of the packet based on the value of the at least one received field before the one or more other fields are received; and generating a reply packet based on the one or more received fields and the predicted one or more other fields.

56. A method for predicting a protocol data field of a packet, comprising:

receiving a plurality of fields of the packet, the packet being broken into one or more packets, one of the fields including the fragment offset field or sequence number field;

analyzing a value of data stored in the fragment offset field or sequence number field;

predicting a value stored in the protocol data field based on the value of the fragment offset field or a sequence number field before the protocol data field is received; and processing the packet based on the received fields and the predicted protocol data field.

57. A device that predicts one or more fields of a packet having a plurality of fields, the packet belonging to a set of packets, each of the fields containing data representing a value, the device comprising:

logic configured to receive one or more fields of the packet;

logic configured to determine a first value of at least one of the received fields;

logic configured to predict a second value based on a correlation between the first value and a property of one or more other fields before the one or more other fields are received; and logic configured to process the packet based on the one or more received fields and the predicted one or more other fields.

* * * * *